United States Patent
Chen et al.

(10) Patent No.: US 12,004,113 B2
(45) Date of Patent: Jun. 4, 2024

(54) METHOD FOR PROCESSING A NON-ACCESS STRATUM REQUEST, AND NETWORK DEVICES

(71) Applicant: GUANGDONG OPPO MOBILE TELECOMMUNICATIONS CORP., LTD., Dongguan (CN)

(72) Inventors: Jingran Chen, Dongguan (CN); Fei Lu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/240,232

(22) Filed: Aug. 30, 2023

(65) Prior Publication Data
US 2023/0413213 A1    Dec. 21, 2023

Related U.S. Application Data

(63) Continuation of application No. PCT/CN2021/098501, filed on Jun. 5, 2021.

(51) Int. Cl.
*H04W 60/04*    (2009.01)
*H04W 64/00*    (2009.01)

(52) U.S. Cl.
CPC ........... *H04W 60/04* (2013.01); *H04W 64/00* (2013.01)

(58) Field of Classification Search
CPC ... H04W 60/04; H04W 60/00; H04W 64/003; H04W 88/00; H04W 88/02; H04W 88/08; H04W 88/184; H04W 92/00; H04W 92/16; H04W 92/10; H04W 4/02; H04W 4/021; H04W 4/023; H04W 4/025; H04W 4/029; H04W 8/08; H04W 8/16; H04W 76/11; H04W 76/00; H04W 72/543; H04W 4/14; H04W 88/023; H04W 48/04; H04W 76/32; H04W 8/14; H04W 64/00; H04W 8/24; G06F 16/387; G06F 16/587; G06F 16/909

See application file for complete search history.

(56) References Cited

U.S. PATENT DOCUMENTS 9,215,645 B2    12/2015 Susitaival
11,496,880 B2*  11/2022 Ryu et al. ............... H04W 8/08
11,778,684 B2*  10/2023 Lindheimer et al. .. H04W 76/27
(Continued)

FOREIGN PATENT DOCUMENTS

CA    3121287 A1    6/2020
CN    108934067 A    12/2018
(Continued)

OTHER PUBLICATIONS

Chen Li et al. (KR 20190066629 A) >> A Location Area Update Method of a User Terminal, An Access Network Entity, A User Terminal and a Core Network Entity (see title). (Year: 2019).*

(Continued)

*Primary Examiner* — Meless N Zewdu
(74) *Attorney, Agent, or Firm* — BAYES PLLC

(57) ABSTRACT

A method for processing a Non-access stratum request and network devices are provided. The method includes: receiving the NAS request of a terminal device and at least two tracking area identities for the terminal device from a second network device and accepting the NAS request.

15 Claims, 14 Drawing Sheets

(56) References Cited

U.S. PATENT DOCUMENTS

| | | | |
|---|---|---|---|
| 2011/0153844 A1* | 6/2011 | Bovo et al. | 709/228 |
| 2012/0189016 A1* | 7/2012 | Bakker et al. | 370/401 |
| 2012/0207013 A1* | 8/2012 | Kamalaraj et al. | 370/328 |
| 2012/0281531 A1 | 11/2012 | Susitaival | |
| 2013/0208703 A1* | 8/2013 | Sugimoto et al. | H04W 60/04 |
| 2014/0198637 A1* | 7/2014 | Shan et al. | H04L 47/122 |
| 2015/0245256 A1* | 8/2015 | Kiss | H04W 36/0038 |
| 2016/0255540 A1* | 9/2016 | Kweon et al. | H04W 28/08 |
| 2016/0309379 A1* | 10/2016 | Pelletier et al. | H04W 36/04 |
| 2020/0187144 A1 | 6/2020 | Ying | |
| 2020/0260384 A1* | 8/2020 | Ryu et al. | H04W 52/0261 |
| 2020/0267785 A1* | 8/2020 | Talebi et al. | H04W 76/12 |
| 2021/0143898 A1 | 5/2021 | Edge | |
| 2021/0143900 A1 | 5/2021 | Edge | |
| 2021/0144669 A1* | 5/2021 | Edge | H04W 64/00 |
| 2021/0153286 A1* | 5/2021 | Park et al. | H04W 76/22 |
| 2021/0242933 A1 | 8/2021 | Edge | |
| 2021/0289339 A1 | 9/2021 | Yu | |

FOREIGN PATENT DOCUMENTS

| | | |
|---|---|---|
| CN | 109548099 A | 3/2019 |
| CN | 111246393 A | 6/2020 |
| CN | 111866842 A | 10/2020 |
| CN | 111866970 A | 10/2020 |
| CN | 112188471 A | 1/2021 |
| WO | 2021092504 A1 | 5/2021 |

OTHER PUBLICATIONS

Xu et al. (WO 2022227098 A1) >>> Information Transmission Method, System, and Apparatus (see title). (Year: 2022).*

Kang et al. (CN 106488538 A) >>> A Special Network Selection Method, Terminal, Access Network Node and a Core Network Node (see title). (Year: 2017).*

(WO 2020197271 A1) >>> De-Prioritization of Non-Terrestrial Network Cells Not Providing Current Tracking Area Code of User Equipment (see title). (Year: 2020).*

International Search Report in the international application No. PCT/CN2021/098501, mailed on Mar. 2, 2022. 6 pages with English translation.

Written Opinion of the International Search Authority in the international application No. PCT/CN2021/098501, mailed on Mar. 2, 2022. 11 pages with English translation.

3GPP TS 23.502 V17.0.0 (Mar. 2021), 3rd Generation Partnership Project; Technical Specification Group Services and System Aspects; Procedures for the 5G System (5GS); Stage 2 (Release 17). Section 4.2.4. 640 pages.

SA WG2 Meeting #S2-145E S2-2103770, May 17-28, 2021, Electronic meeting, 3GPP TSG RAN WG2 Meeting #113bis-e R2-2104377, Electronic, Apr. 12-Apr. 20, 2021, Title: LS on multiple TACs per PLMN, Response to, Release: Release 17, Work Item: NR_NTN_solutions-Core. The whole document. 2 pages.

3GPP TSG-RAN WG3 Meeting #103 R3-190178, Athens, Greece, Feb. 25-Mar. 1, 2019, Title: NR-NTN: Tracking Area Management, Source: Fraunhofer IIS, Fraunhofer HHI, Document for: Agreement, Agenda Item: 20.2.3. Paging. The whole document. 15 pages.

3GPP TSG RAN WG2 #113b-e R2-2104364, Electronic Meeting, Apr. 12-Apr. 20, 2021, Source: Huawei, HiSilicon, Title: Summary of offline 105—[NTN] TAC update, Agenda Item: 8.10.3.1, Document for: Discussion and decision. The whole document. 14 pages.

3GPP TSG RAN WG2 Meeting #113bis-e R2-2103076, e-Meeting, Apr. 12-Apr. 20, 2021, Agenda item: 8.10.3.1 Source: Samsung, Title: TAC Management and Neighbor Search in an NTN, Document for: Discussion & Decision. The whole document. 8 pages.

Nokia et al: "TP for Tracking Area, Paging and Location", 3GPP Draft; R3-193216, 3rd Generation Partnership Project (3GPP), Mobile Competence Centre ; 650, Route Des Lucioles ; F-06921 Sophia-Antipolis Cedex; France vol. RAN WG3, No. Reno, NV, USA; May 13, 2019-May 17, 2019, May 21, 2019 (May 21, 2019), XP051740776, paragraph 8.1.2, 5 pages.

Nokia et al: "Service operations", 3GPP Draft; C3-175089 PCR 29507ServiceOperations, 3rd Generation Partnership Project (3CPP), Mobile Competence Centre ;650, Route Des Lucioles ; F-06921 Sophia-Antipolis Cedex ; France vol. CT WG3, No. Kochi, India; Oct. 23, 2017-Oct. 27, 2017 Oct. 23, 2017 (Oct. 23, 2017), XP051338530, paragraph 4.2.2.3.1, 5 pages.

Supplementary European Search Report in the European application No. 21943601.1, mailed on Mar. 28, 2024, 12 pages.

* cited by examiner

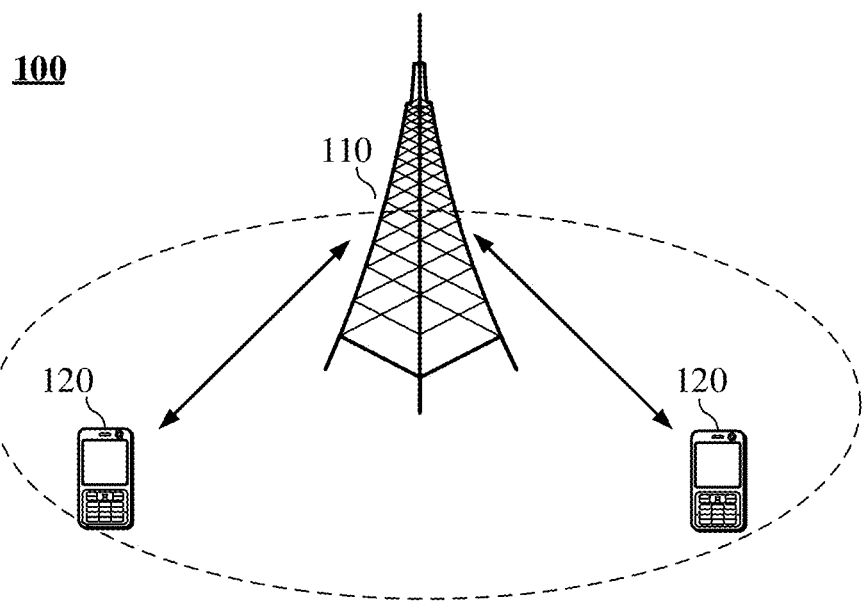
FIG. 1
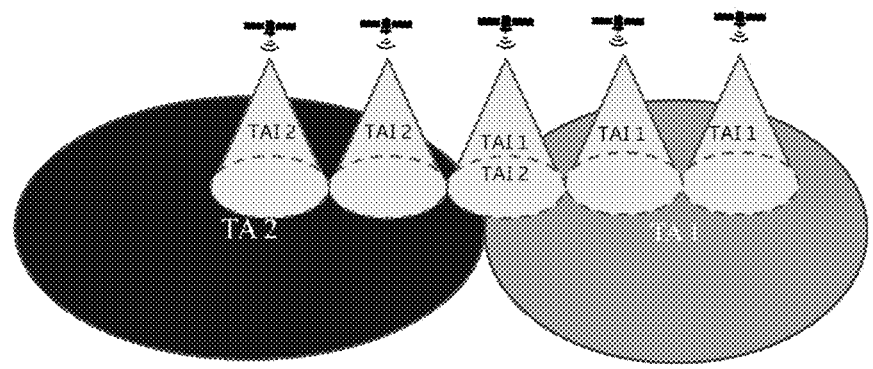
FIG. 2
300
A first network device receives a TAI of a first TA where a terminal device is located from a second network device — S310
An indication that the terminal device is in the first TA is transmitted to the terminal device — S320
FIG. 3

600 — In response to receiving an NAS request from a terminal device, a second network device determines a first TA where the terminal device is located from at least two TAs corresponding to at least two TAIs for the terminal device — S610

FIG. 6

700 — A first network device receives an NAS request of a terminal device and at least two TAIs for the terminal device from a second network device — S710

The first network device accepts the NAS request — S720

FIG. 7

METHOD FOR PROCESSING A NON-ACCESS STRATUM REQUEST, AND NETWORK DEVICES

CROSS-REFERENCE TO RELATED APPLICATION

This application is a continuation of International Patent Application No. PCT/CN2021/098501, filed on Jun. 5, 2021, the disclosure of which is hereby incorporated by reference in its entirety.

BACKGROUND

In a satellite network, such as in a Low-Earth Orbit (LEO), a satellite moves relative to the ground, and beams transmitted by the satellite also move relative to the ground. In a case that a location of a tracking area (TA) is fixed, as the satellite moves relative to the ground, the satellite may firstly covers only one TA, then covers part areas of at least two TAs at the same time, and then covers only another TA. In an update mode of Soft Tracking Area Code (Soft TAC), when the satellite covers at least two TAs at the same time, it may broadcast the TACs corresponding to these TAs simultaneously, which results in the situation that the terminal device receives at least two TACs at the same time. In such situation, the terminal device may not know the TA where the terminal device is located, which affects a normal communication process.

SUMMARY

The present application relates to the field of communications, and more particularly, to a method for processing a Non-access stratum (NAS) request and network devices.

An embodiment of the present disclosure provides a method for processing a Non-access stratum (NAS) request. The method is applied to a first network device. The method includes the following operations.

The first network device receives an NAS request of a terminal device and at least two TAIs for the terminal device from a second network device.

The first network device accepts the NAS request.

An embodiment of the present disclosure provides a network device. The network device is a first network device and includes a processor, a memory configured to store a computer program and a transceiver.

The processor is configured to invoke and run the computer program stored in the memory to receive an NAS request of a terminal device and at least two TAIs for the terminal device from a second network device.

The processor is configured to accept the NAS request.

An embodiment of the present disclosure further provides a network device. The network device is a second network device and includes a processor, a memory configured to store a computer program and a transceiver.

The processor is configured to invoke and run the computer program stored in the memory to receive an NAS request from a terminal device.

The processor is configured to invoke and run the computer program stored in the memory to transmit the NAS request and at least two TAIs for the terminal device to a first network device.

BRIEF DESCRIPTION OF THE DRAWINGS

FIG. 1 is a schematic diagram of an application scenario of embodiment of the present disclosure.

FIG. 2 is a schematic diagram of an update mode of Soft TAC in a satellite beam moving scenario.

FIG. 3 is a schematic flowchart of a method 300 for indicating a TA where a terminal device is located according to an embodiment of the present disclosure.

FIG. 6 is a schematic flow diagram of a method 600 for determining a TA where a terminal device is located according to an embodiment of the present disclosure.

FIG. 7 is a schematic flowchart of a method for processing an NAS request 700 according to an embodiment of the present disclosure.

DETAILED DESCRIPTION

Figure 4:
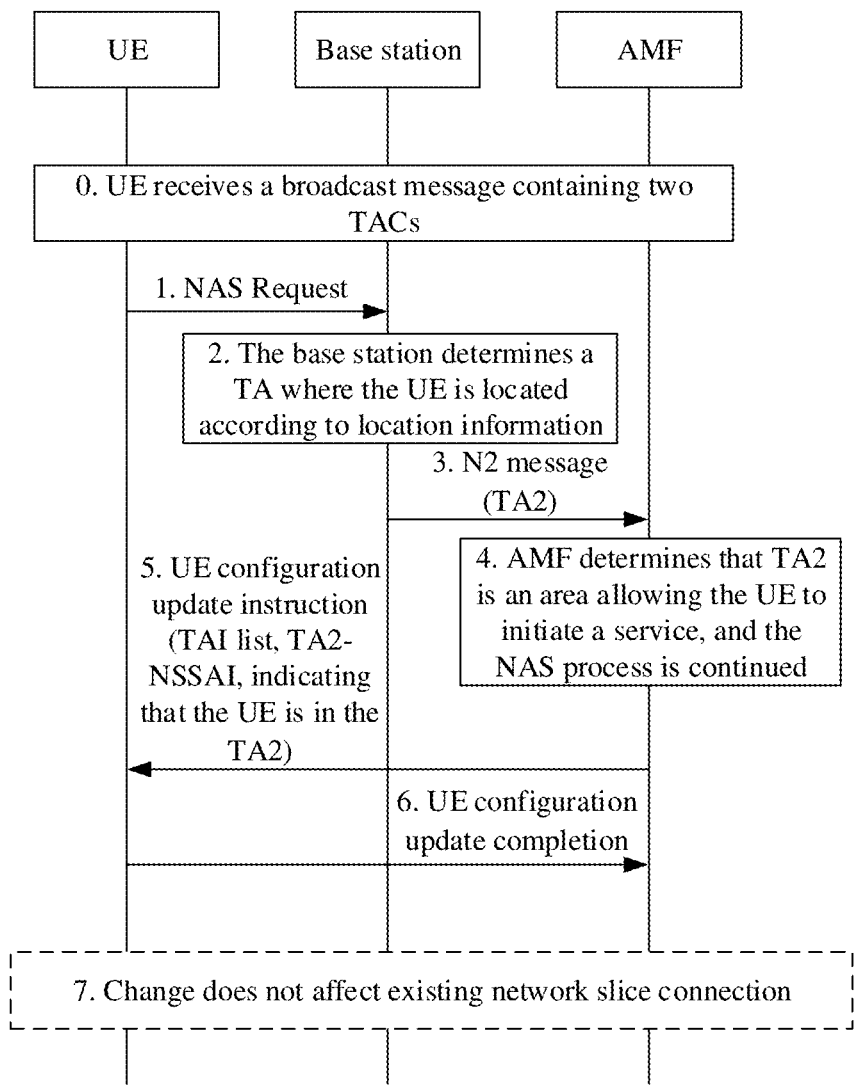
FIG. 4 is an implementation flowchart of a first embodiment of the present disclosure.

The technical solutions in the embodiments of the present disclosure will be described below with reference to the drawings in the embodiments of the present disclosure.

It should be noted that the terms "first", "second", etc. in the description and claims of embodiments of the present disclosure and the above drawings are used to distinguish similar objects and are not necessarily used to describe a specific order or priority. The objects described in the "first" and "second" at the same time can be the same or different.

The technical solutions of the embodiments of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, and LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), 5th-Generation (5G) system or other communication systems.

In general, conventional communication systems support a limited number of connections and are easy to be implemented. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, etc. Embodiments of the present disclosure may also be applied to these communication systems.

Alternatively, the communication system in the embodiments of the present disclosure may be applied to a Carrier Aggregation (CA) scenario, a Dual Connectivity (DC) scenario, and a Standalone (SA) network distribution scenario.

Embodiments of the present disclosure do not limit spectrums applied. For example, embodiments of the present disclosure may be applied to a licensed spectrum or an unlicensed spectrum.

Various embodiments of the present disclosure are described in combination with a network device and a terminal device. The terminal device may also be referred to as User Equipment (UE), an access terminal, a subscriber unit, a subscriber station, a mobile station, a mobile stage, a remote station, a remote terminal, a mobile device, a user terminal, a terminal, a wireless communication device, a user agent or a user device, etc. The terminal device may be a STATION (ST) in a WLAN, a cellular telephone, a cordless telephone, a Session Initiation Protocol (SIP) telephone, a Wireless Local Loop (WLL) station, a Personal Digital Assistant (PDA) device, a handheld device and a computing device having a wireless communication function or other processing device connected to a wireless modem, a vehicle-mounted device, a wearable device, and a terminal device in a next generation communication system, such as a terminal device in an NR network or in a future evolved Public Land Mobile Network (PLMN) network.

By way of example and not limitation, in the embodiments of the present disclosure, the terminal device may also be a wearable device. The wearable device may also be called as a wearable intelligent device, which is a general name of wearable devices developed by applying wearable technology to intelligently design daily wears, such as glasses, gloves, watches, clothing and shoes. The wearable device is a portable device that is worn directly on the body or integrated into the clothes or accessories of user. The wearable device is not only a kind of a hardware device, but may also realize powerful functions through software support, data interaction and cloud interaction. Generalized wearable smart device has features of full functions, large size and implementation of complete or partial functions without relying on smart phones, such as smart watches or smart glasses, and of only focusing on certain application functions, being used in conjunction with other devices such as smart phones, such as various smart bracelets and smart jewelry for monitoring physical signs.

The network device may be a device for communicating with a mobile device. The network device may be an Access Point (AP) in a WLAN, a Base Transceiver Station (BTS) in a GSM or CDMA, a base station (NodeB, NB) in a WCDMA, an Evolutional Node B (eNB or eNodeB) in an LTE, a relay station or an AP, a vehicle-mounted device, a wearable device, a network device in a NR network (gNB) or a network device in a future evolved PLMN network, etc.

In the embodiments of the present disclosure, the network device provides services for a cell, and the terminal device communicates with the network device through transmission resources (e.g. frequency domain resources, or spectrum resources) used by the cell. The cell may be a cell corresponding to the network device (e.g. base station), and the cell may be covered by a macro base station or a base station corresponding to a Small cell. The Small cell may include a Metro cell, a Micro cell, a Pico cell, a Femto cell, etc. These Small cells have the characteristics of small coverage and low transmission power, and are suitable for providing high-speed data transmission services.

FIG. 1 exemplarily illustrates one network device 110 and two terminal devices 120. Alternatively, the wireless communication system 100 may include a plurality of network devices 110, and a coverage of each network device 110 may include other numbers of terminal devices 120, which are not limited in the embodiments of the present disclosure. The embodiments of the present disclosure may be applied to one terminal device 120 and one network device 110, and may also be applied to one terminal device 120 and another terminal device 120.

Alternatively, the wireless communication system 100 may also include other network entities, such as a Mobility Management Entity (MME), an Access and Mobility Management Function (AMF), etc. Embodiments of the present disclosure are not limited thereto.

It should be understood that the terms "system" and "network" are often used interchangeably herein. In the present disclosure, the term "and/or" is merely used for describing an association relationship of related objects, indicates that there may be three relationships, for example, A and/or B, which means that there are three cases: A exists alone, both A and B exist, and B exists alone. In addition, the character "/" in the present disclosure generally indicates that there is "or" relationship between the related objects.

It should be understood that the "indicating" mentioned in embodiments of the present disclosure may be a direct indication, may be an indirect indication, or may be represent an association. For example, the expression that A indicates B may mean that A directly indicates B, for example, B may be obtained through A. The expression may also mean that A indirectly indicates B, for example, A indicates C, and B may be obtained by C. The expression may also indicate that there is an association relationship between A and B.

In the description of embodiments of the present disclosure, the term "correspondence" may mean that there is a direct correspondence or an indirect correspondence between the two objects, may also mean that there is an association relationship between the two objects, may also be a relationship of indicating and being indicated, configuring and being configured, etc.

In order to facilitate understanding of the technical solutions of the embodiments of the present disclosure, the related technologies of the embodiments of the present disclosure are described in the following. The following related technologies, as an alternative solution, may be arbitrarily combined with the technical solutions of the embodiments of the present disclosure, all of which fall within the protection scope of the embodiments of the present disclosure.

FIG. 2 exemplarily illustrates an update mode of Soft TAC in a satellite beam moving scenario. As illustrated in FIG. 2, TA1 and TA2 are areas with fixed geographical locations. During movement of the satellite, the satellite covers TA1, then covers part areas of TA1 and TA2 at the same time, and then only covers TA2. In the Soft TAC mode, when the satellite covers both TA1 and TA2, the satellite may broadcast two TACs (including TAC1 and TAC2) at the same time, so the UE will receive two TACs at the same time, which results in that the UE cannot determine the TA where the UE is located. For example, in a case where the TA1 is in a registration area (RA) of the UE and the TA2 is not in the RA of the UE, since the UE always receives two TACs when the UE moves from TA1 to TA2, the UE cannot judge whether it is in TA1 or TA2 currently. After the UE registered in TA1 moves to TA2, the UE may still initiate subsequent non-access-stratum (NAS) processes, such as a service request or Protocol Data Unit (PDU) session establishment. In addition, if user location information (ULI) transmitted by the base station to a core network carries two TAIs (each TAI corresponds to one TAC, and TAI contains the corresponding TAC and the indication of the country where it is located), the core network has no corresponding mechanism to deal with this case at present.

Embodiments of the present disclosure provide a method for indicating a TA where a terminal device is located. FIG. 3 is a schematic flowchart of a method 300 for indicating a TA where a terminal device is located according to an embodiment of the present disclosure. Alternatively, the method may be applied to the system as illustrated in FIG. 1 or FIG. 2, but is not limited thereto. The method may be applied to a first network device. The method includes at least part of the following contents.

In operation S310, a first network device receives a TAI of a first TA where a terminal device is located from a second network device.

In operation S320, an indication that the terminal device is in the first TA is transmitted to the terminal device.

The above operation S320 may include the following operation.

In response to determining that the first TA is an area allowing the terminal device to initiate a service and the first TA being not in an RA configured by a core network for the terminal device, the first network device transmits a configuration update instruction to the terminal device. The configuration update instruction carries the indication that the terminal device is in the first TA.

Alternatively, in response to determining that the first TA is a restricted area, the first network device transmits a rejection message to the terminal device. The rejection message carries the indication that the terminal device is in the first TA.

Through performing the above process, the network device indicates the TA where the UE is located to the UE, so that the terminal device may know the TA where the terminal device is located, so as to perform a normal communication process and reduce improper operations on the communication process.

The first network device may be a core network device, such as an AMF, and the second network device may be a base station.

Taking the first network device being the AMF and the second network device being the base station as an example, in the above method, the interaction process between the AMF and the base station may include the following operations.

1. The base station receives an NAS request from the terminal device, determines the first TA where the terminal device is located, and transmits the TAI of the first TA to the AMF.
2. If the first TA is the area allowing the terminal device to initiate a service and the first TA is not in the RA configured by the core network for the terminal device, the AMF adds the first TA to the RA and feeds back the configuration update instruction to the terminal device. The configuration update instruction carries the indication that the terminal device is in the first TA.
3. If the first TA is the restricted area, the AMF feeds back the rejection message to the terminal device. The rejection message carries the indication that the terminal device is in the first TA.

Taking the first network device being an AMF and the second network device being a base station as an example, the above method is described in detail with following specific embodiments.

First Embodiment

In this embodiment, a secure connection is established after the UE is registered, and the base station may know the accurate location of the UE through information such as UE location measurement or Global Navigation Satellite System (GNSS), and may obtain the TA where the UE initiates the NAS process through a mapping relationship between the information and a geographical location of the TA (in this embodiment and the following embodiments, the TA where the UE is located is called as the first TA). For example, when the terminal device moves from the TA1 to the TA2, the first TA where the UE is currently located is TA2. The base station transmits ULI to the AMF, and the ULI carries the TAI of the first TA (i.e. TA2).

FIG. 4 is an implementation flowchart of the first embodiment of the present disclosure. The implementation includes the following operations.

1. The UE transmits an NAS message, such as a service request or PDU session establishment request, to a base station.
2. The base station determines the first TA where the UE is currently located according to location information of the UE.
3. The base station transmits an N2 message to the AMF. The N2 message carries ULI which carries a TAI of the first TA (such as TA2) where the UE is currently located.
4. The AMF determines whether TA2 is an area allowing the terminal device to initiate a service (Allowed Area), and determines whether TA2 is in the RA configured by a core network for the terminal device. In this embodiment, considering that TA2 is an area allowing the UE to initiate the service and TA2 is not in the RA of the UE, TA2 may be added to the RA of the UE and the subsequent NAS process may be continued.
5. The AMF transmits a configuration update instruction to the UE. The configuration update instruction includes an updated TAI list, and the TAI list contains the TA2. The configuration update instruction carries an indication that the UE is in TA2. For example, a dedicated field is provided in the configuration update instruction and the value of the field is set to TA2, which indicates that the UE is currently in the TA2.

Alternatively, if the TA2 corresponds to new slice information, the new slice information is contained in the configuration update instruction transmitted to the UE.

6. After receiving the configuration update instruction, UE needs to response and transmits a configuration update completion message to the AMF.
7. Since the new slice information provided by the AMF has no impact on an existing slice connection, the AMF does not need to release an NAS signaling connection after receiving the response, and the UE does not need to perform a registration process immediately.

Second Embodiment

Similar to the first embodiment, a base station has a capability of determining a first TA where UE is located. The difference between the first embodiment and this embodiment is that in this embodiment, the first TA where the UE is located is considered to be a restricted area.

Figure 5:
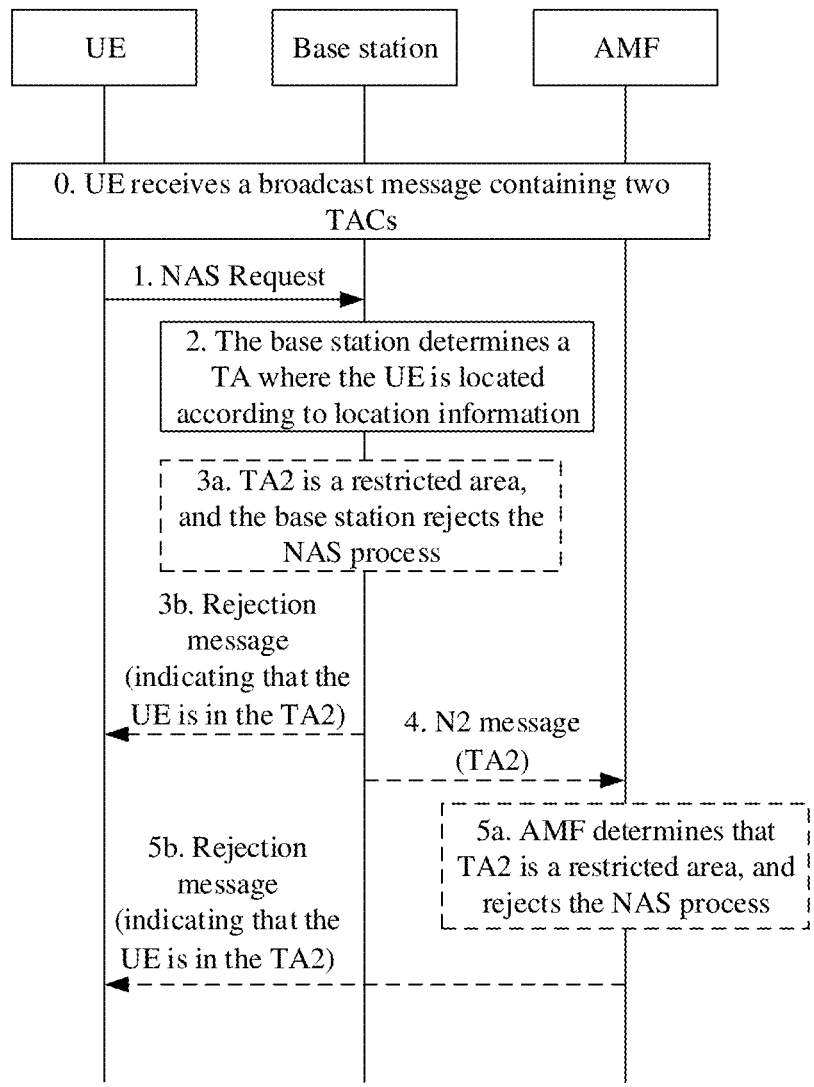
FIG. 5 is an implementation flowchart of a second embodiment of the present disclosure.

FIG. 5 is an implementation flowchart of the second embodiment of the present disclosure. The implementation includes the following operations.

1. The UE transmits an NAS message, such as a service request or a PDU session establishment request, to the base station.
2. The base station determines the first TA (for example, TA2) where the UE is currently located according to location information of the UE. Then, if the base station has the capability of determining whether the TA2 is a restricted area, the process proceeds to operation 3a and operation 3b. If the base station has no capability of determining whether the TA2 is the restricted area, then the process proceeds to operation 4, the operation 5a and the operation 5b.
3a. The base station determines that the TA2 is the restricted area through a mobility restriction list transmitted by a core network previously. The restricted area includes a non-allowed area or a forbidden area.
3b. The base station transmits a rejection message to the UE, the rejection message carries an indication that the UE is in the TA2. For example, a dedicated field is provided in the rejection message, and the value of the field is set to TA2, which indicates that the UE is currently in the TA2.
4. If the base station is unable to determine whether the TA2 is the restricted area, the base station transmits an N2 message to the AMF. The N2 message carries ULI which carries a TAI of the first TA (i.e., TA2) where the UE is currently located.
5a. The AMF determines that the TA2 is a restricted area which includes a non-allowed area or a forbidden area, and then rejects the NAS process.
5b. The AMF transmits a rejection message to the UE, and the rejection message carries an indication that the UE is in the TA2. For example, a dedicated field is provided in the rejection message, and the value of the field is set to TA2, which indicates that the UE is currently in the TA2.

With reference to the first and second embodiments described above, the present disclosure provides a method for determining a TA where a terminal device is located. FIG. 6 is a schematic flowchart of a method 600 for determining a TA where a terminal device is located according to an embodiment of the present disclosure. Alternatively, the method may be applied to the system illustrated in FIG. 1 or FIG. 2, but is not limited thereto. The method may be applied to a second network device. The method includes at least part of the following contents.

In operation S610, in response to receiving an NAS request from a terminal device, a second network device determines a first TA where the terminal device is located from at least two TAs corresponding to at least two TAIs for the terminal device.

Further, the second network device may transmit a TAI of the first TA to a first network device.

For example, the second network device transmits an N2 message to the first network device. The N2 message carries ULI which carries the TAI of the first TA.

Alternatively, the second network device may be a base station and the first network device may be an AMF.

If the base station has a capability of determining whether the first TA is a restricted area, the method may further include the following operation.

When it is determined that the first TA is the restricted area, the second network device (i.e., the base station) transmits a rejection message to the terminal device. The rejection message carries an indication that the terminal device is in the first TA. For example, a dedicated field is provided in the rejection message, and the value of the field is set to the TAI of the first TA, which indicates that the UE is currently in the first TA.

Alternatively, the above restricted area includes a non-allowed area or a forbidden area.

Alternatively, the operation of determining the first TA where the terminal device is located may include the following operations.

The second network device determines a location of the terminal device.

The second network device determines the first TA where the terminal device is located according to the location.

The above NAS request may include a service request or a PDU session establishment request, etc.

Embodiments of the present disclosure provide a method for processing an NAS request. FIG. 7 is a schematic flowchart of a method 700 for processing an NAS request according to an embodiment of the present disclosure. Alternatively, the method may be applied to the system as illustrated in FIG. 1 or FIG. 2, but is not limited thereto. The method may be applied to an AMF. The method includes at least part of the following contents.

In operation S710, a first network device receives an NAS request of a terminal device and at least two TAIs for the terminal device from a second network device.

In operation S720, the first network device accepts the NAS request.

Alternatively, the first network device includes an AMF and the second network device includes a base station.

In this case, the base station has no capability of determining an accurate location of the terminal device. Therefore, all the TAIs (at least two TAIs) for the terminal device are transmitted to the AMF. The first TA where the terminal is located is determined by the AMF.

The base station may transmit an N2 message to the AMF, and the N2 message carries at least two TAIs for the NAS request of the terminal device. For example, the above operation S710 includes the following operations. The first network device receives the N2 message from the second network device. The N2 message carries the NAS request and ULI which carries two TAIs for the terminal device.

Before the operation S710, the base station receives the NAS request from the UE. For example, the base station receives an NAS request, such as a PDU session establishment request, transmitted by UE in a connected state.

Alternatively, the base station receives an NAS request, such as a service request, transmitted by UE in an idle state.

In the TAIs received by AMF, at least one TA corresponding to at least one TAI is an area allowing the UE to initiate a service. That is, there are the following two cases.

First case: the TAs corresponding to all TAIs received by the AMF are the areas allowing the UE to initiate the service. In this case, any TA the UE currently located is an area allowing the UE to initiate the service, so that the AMF accepts the NAS request and continues to perform the NAS process.

Second case: a part of the TAs corresponding to the TAIs received by the AMF is the area allowing the UE to initiate the service, and another part is the restricted area. In this case, the TA where the UE is currently located may be the area allowing the UE to initiate the service, or may be the restricted area. the TA where the UE is currently located may be the area allowing the UE to initiate the service, or may be the restricted area, in both cases, the AMF first considers that the TA where the UE is currently located is the area allowing the UE to initiate the service, accepts the NAS request, and continues to perform the NAS process. After determining that the first TA where the UE is currently located is the restricted area, the AMF releases the corresponding connection.

As can be seen from the above description, in any of above cases, after the AMF receives the NAS request and at least two TAIs, it firstly accepts the NAS request, that is, the above operation S720 is performed.

If all TAs corresponding to the TAIs received by the AMF are areas allowing the terminal device to initiate the service, the AMF may complete the configuration update of the UE. Further, the AMF may determine the first TA where the UE is located, and the configuration update instruction transmitted by the AMF to the UE carries an indication that the UE is in the first TA.

If not all the TAs corresponding to the TAIs received by the AMF are areas allowing the terminal device to initiate the service, the AMF may determine the first TA where the UE is located. Then, in response to determining that the first TA is an area allowing the terminal device to initiate a service and the first TA is not in the RA configured by the core network for the terminal device, the configuration update is performed on the terminal device. In response to determining that the first TA is a restricted area, the AMF releases the corresponding connection.

Therefore, after the above operation S720, the method may further include the following operation.

The first network device transmits a configuration update instruction to the terminal device in response to the above at least two TAs corresponding to the at least two TAIs being areas allowing the terminal device to initiate the service.

Alternatively, after the above operation S720, the method may further include the following operations.

The first network device determines the first TA where the terminal device is located from the at least two TAs corresponding to the at least two TAIs.

In the case that the first TA is an area allowing the terminal device to initiate a service and the first TA is not in the RA configured by the core network for the terminal device, the first network device transmits a configuration update instruction to the terminal device. The configuration update instruction carries an indication that the terminal device is in the first TA.

This method is applicable to the case that the at least two TAs corresponding to the at least two TAIs received by the AMF are areas allowing the terminal device to initiate the service, and is also applicable to the case that not all of the at least two TAs corresponding to the at least two TAIs are areas allowing the terminal device to initiate the service.

Alternatively, after the above operation S720, the method may further include the following operations.

The first network device determines the first TA where the terminal device is located from the at least two TAs corresponding to the at least two TAIs.

In response to the first TA being a restricted area, the first network device transmits an N2 resource release request to the second network device or transmits a connection release request to the terminal device. The N2 resource release request carries an indication that the terminal device is in the first TA, alternatively, the connection release request carries the indication that the terminal device is in the first TA. For example, the AMF transmits the N2 resource release request to the base station, and the AMF transmits the connection release request to the UE.

Alternatively, the above restricted area includes a non-allowed area or a forbidden area.

In some embodiments, in the above process, the operation of the first network device determining the first TA where the terminal device is located includes the following operations.

The first network device performs a location service (LCS) process to determine a location of the terminal device.

The first network device determines the first TA where the terminal device is located according to the location.

Taking the first network device being the AMF and the second network device being the base station as an example, the above method is described in detail with specific embodiments. In the following embodiment, it is considered that the UE receives a broadcast message containing two TACs which includes the TA1 and the TA2.

Third Embodiment

In this embodiment, UE in a connected state initiates an NAS request, such as a PDU session establishment request. The base station has no capability of determining an accurate location of the UE. Therefore, the base station transmits both two TAIs (e.g. TA1, TA2) in ULI in an N2 message to an AMF. In this embodiment, it is considered that both TAs corresponding to the two TAIs are areas allowing the UE to initiate a service. For example, when the terminal device moves from the TA1 to the TA2, the first TA where the UE is currently located is the TA2.

Figure 8:
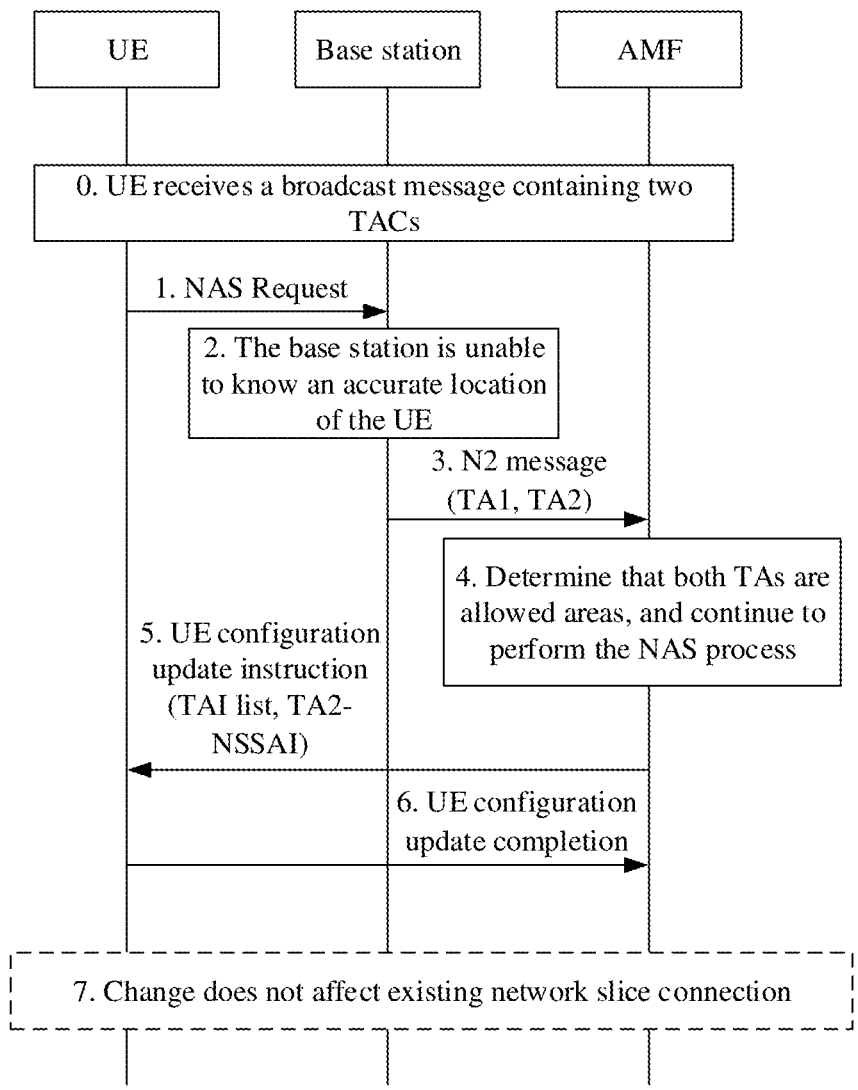
FIG. 8 is an implementation flowchart of a third embodiment of the present disclosure.

FIG. 8 is an implementation flowchart of the third embodiment of the present disclosure. The implementation includes the following operations.

1. The UE in the connection state initiates an NAS request message, such as a PDU session establishment request.

2-3. The base station has no capability of knowing an accurate location of the UE. The base station transmits an N2 message to the AMF. The N2 message carries ULI, and the ULI carries the NAS request and two TAIs for the UE, i.e., TA1 and TA2.

4. The AMF receives the N2 message, accepts the NAS request, and continues to perform the NAS process. The AMF determines whether the two TAs are areas allowing the UE to initiate a service. Since it is considered in this embodiment that both TAs are areas allowing the UE to initiate the service, in this operation, the determination result is that both TAs are areas allowing the UE to initiate the service.

5. The AMF transmits a configuration update instruction to the UE. The configuration update instruction includes an updated TAI list, and the TAI list contains the TA2. Alternatively, if the TA2 corresponds to new slice information, the new slice information is contained in the configuration update instruction, and the configuration update instruction is transmitted to the UE.

6. After receiving the configuration update instruction, the UE needs to response and transmits a configuration update completion message to the AMF.
7. Since the new slice information provided by the AMF has no impact on an existing slice connection, the AMF does not need to release an NAS signaling connection after receiving the response, and the UE does not need to perform a registration process immediately.

Fourth Embodiment

The consideration condition of this embodiment is the same as that of the third embodiment.

Figure 9:
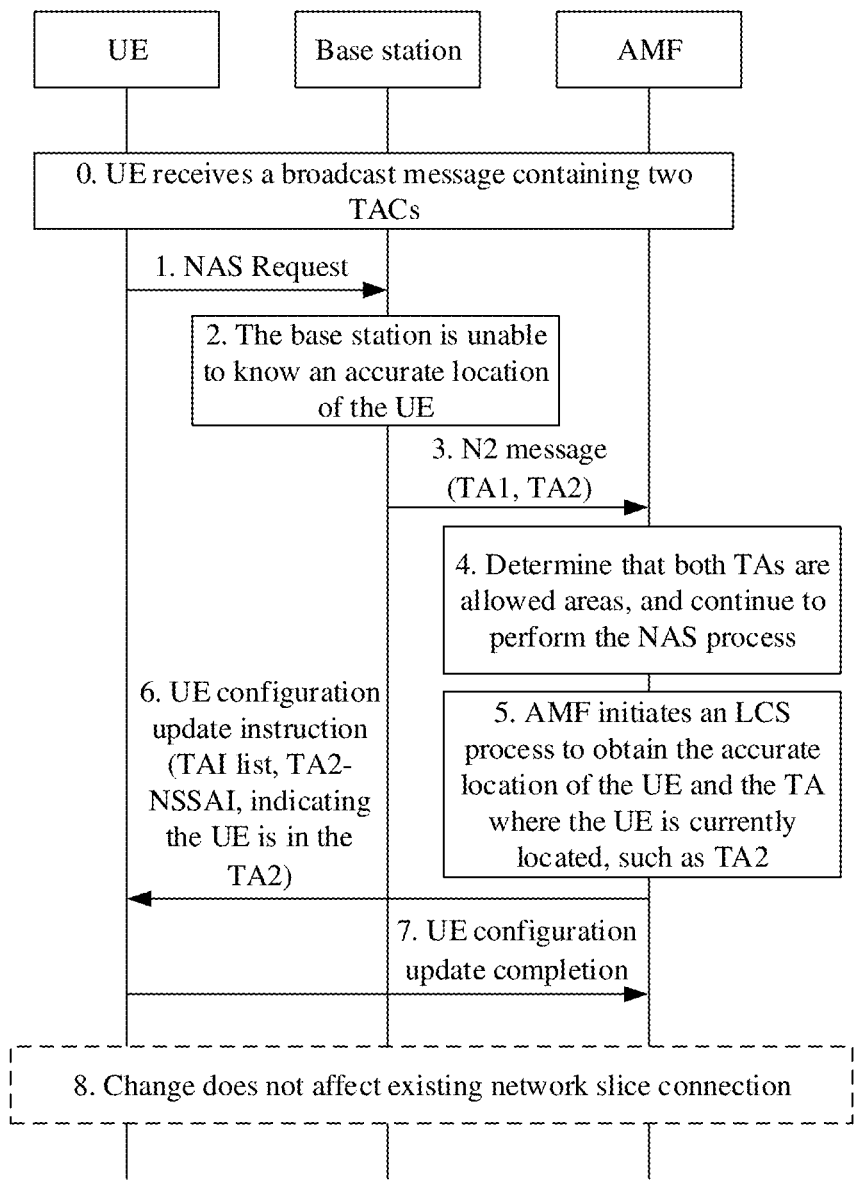
FIG. 9 is an implementation flowchart of a fourth embodiment of the present disclosure.

FIG. 9 is an implementation flowchart of the fourth embodiment of the present disclosure. The implementation includes the following operations.

1. The UE in connected state initiates an NAS request message, such as a PDU session establishment request.
2-3. The base station has no capability of knowing an accurate location of the UE. The base station transmits an N2 message to the AMF. The N2 message carries ULI, and the ULI carries the NAS request and two TAIs for the UE, i.e., TA1 and TA2.
4. The AMF receives the N2 message, accepts the NAS request, and continues to perform the NAS process. The AMF determines whether the two TAs are areas allowing the UE to initiate a service. Since it is considered in this embodiment that both TAs are areas allowing the UE to initiate the service, in this operation, the determination result is that both TAs are areas allowing the UE to initiate the service.
5. The AMF initiates an LCS process to obtain the accurate location information of the UE, and determines an area where the UE is currently located, such as TA2, according to the location of the UE.
6. The AMF transmits a configuration update instruction to the UE. The configuration update instruction includes an updated TAI list. The TAI list contains TA2 and an indication that the UE is in the TA2. For example, a dedicated field is provided in the configuration update instruction, and the value of the field is set to TA2, which indicates that the UE is currently in the TA2. Alternatively, if the TA2 corresponds to new slice information, the new slice information is contained in the configuration update instruction, and the configuration update instruction is transmitted to the UE.
7. After receiving the configuration update instruction, the UE needs to response and transmits a configuration update completion message to the AMF.
8. Since the new slice information provided by the AMF has no impact on an existing slice connection, the AMF does not need to release an NAS signaling connection after receiving the response, and the UE does not need to perform a registration process immediately.

Fifth Embodiment

In this embodiment, UE in an idle state initiates an NAS request, such as a service request. A base station has no capability of determining an accurate location of the UE. Therefore, the base station transmits both TAIs (e.g. TA1, TA2) in ULI in an N2 message to an AMF. In this embodiment, it is considered that both TAs are areas allowing the UE to initiate a service. For example, when the terminal device moves from the TA1 to the TA2, the first TA where the UE is currently located is the TA2.

Figure 10:
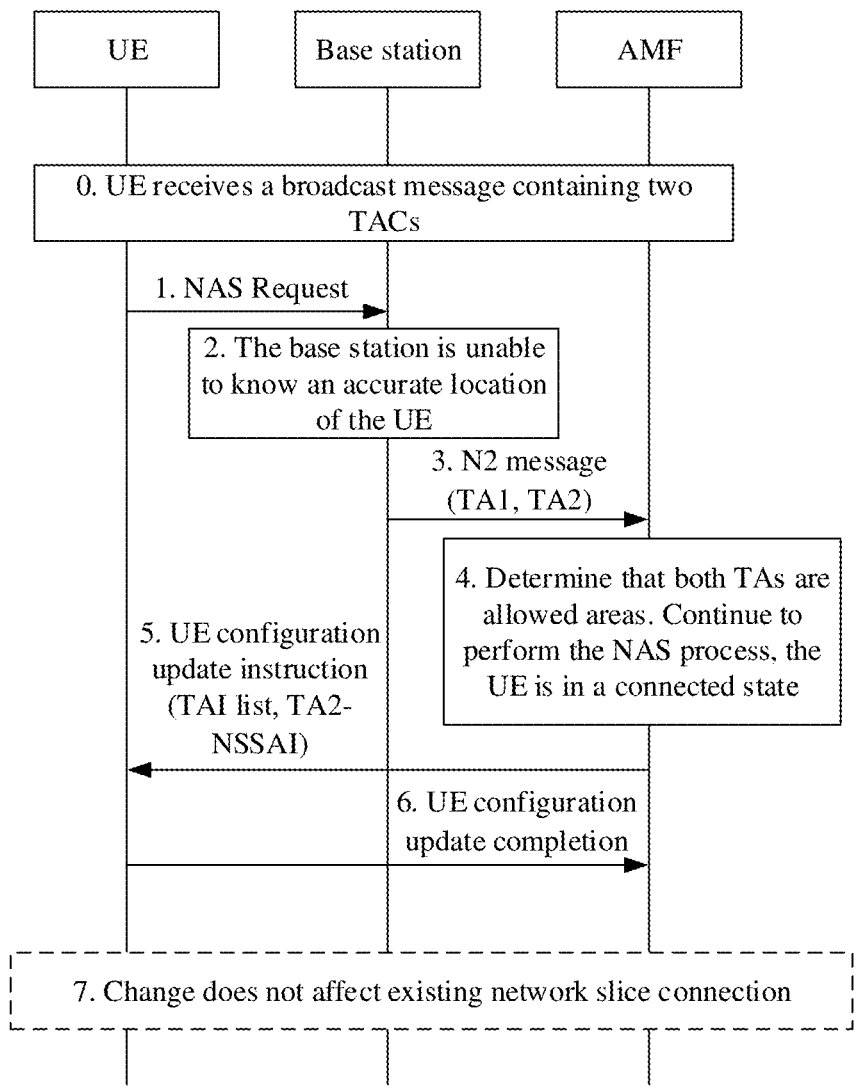
FIG. 10 is an implementation flowchart of a fifth embodiment of the present disclosure.

FIG. 10 is an implementation flowchart of the fifth embodiment of the present disclosure. The implementation includes the following operations.

1. The UE in the idle state initiates an NAS request message, such as a service request.
2-3. The base station has no capability of knowing an accurate location of the UE. The base station transmits an N2 message to the AMF. The N2 message carries ULI, and the ULI carries the NAS request and two TAIs for the UE, i.e., TA1 and TA2.
4. The AMF receives the N2 message, accepts the NAS request, continues to perform the NAS process and enables the UE to be in a connected state. The AMF determines whether the two TAs are areas allowing the UE to initiate a service. Since it is considered in this embodiment that both TAs are areas allowing the UE to initiate the service, in this operation, the determination result is that both TAs are areas allowing the UE to initiate the service.
5. The AMF transmits a configuration update instruction to the UE. The configuration update instruction includes an updated TAI list, and the TAI list contains the TA2. Alternatively, if the TA2 corresponds to new slice information, the new slice information is contained in the configuration update instruction which is transmitted to the UE.
6. After receiving the configuration update instruction, UE needs to response and transmits a configuration update completion message to the AMF.
7. Since the new slice information provided by the AMF has no impact on an existing slice connection, the AMF does not need to release an NAS signaling connection after receiving the response, and the UE does not need to perform a registration process immediately.

Sixth Embodiment

The consideration condition of the present embodiment is the same as that of the fifth embodiment.

Figure 11:
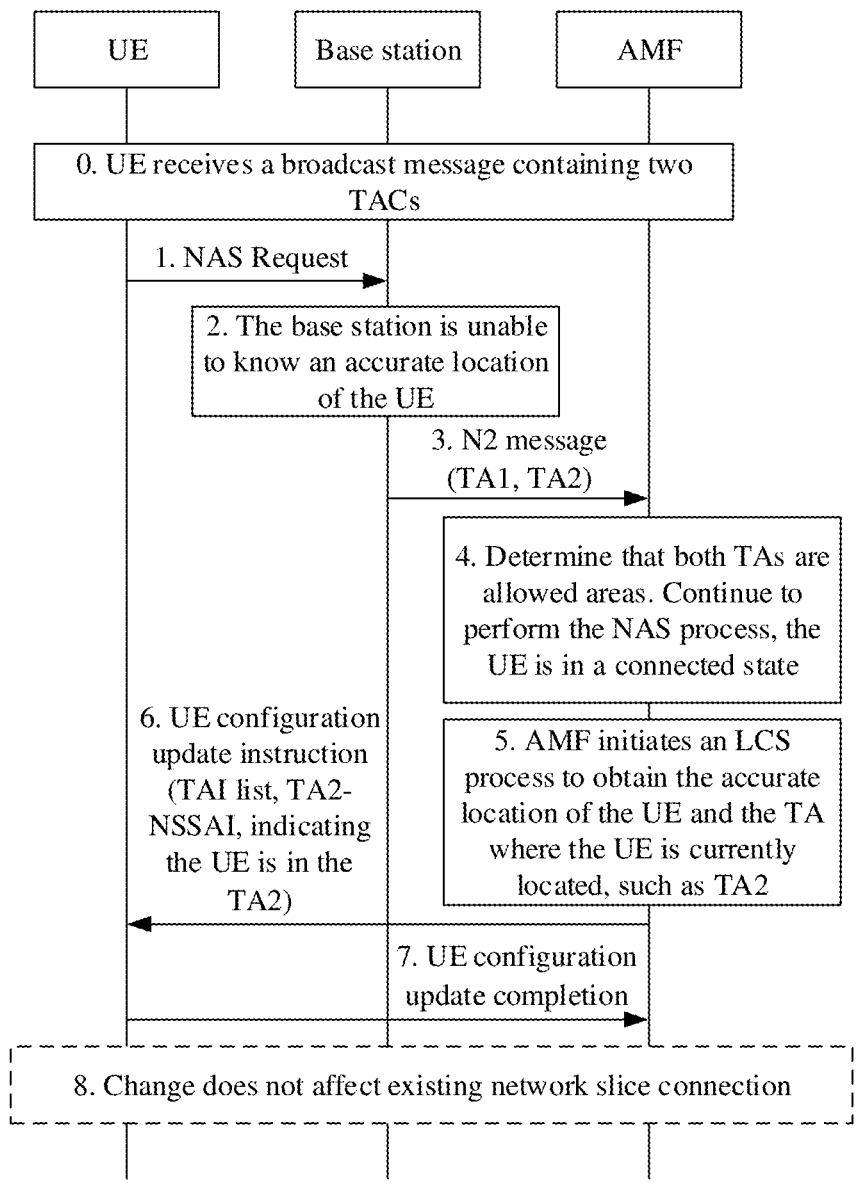
FIG. 11 is an implementation flowchart of a sixth embodiment of the present disclosure.

FIG. 11 is an implementation flowchart of the sixth embodiment of the present disclosure. The implementation includes the following operations.

1. The UE in an idle state initiates an NAS request message, such as a service request.
2-3. The base station has no capability of knowing an accurate location of the UE. The base station transmits an N2 message to the AMF. The N2 message carries ULI, and the ULI carries the NAS request and two TAIs for the UE, i.e., TA1 and TA2.
4. The AMF receives the N2 message, accepts the NAS request, continues to perform the NAS process, and enables the UE to be in an connected state. The AMF determines whether the two TAs are areas allowing the UE to initiate a service. Since it is considered in this embodiment that both TAs are areas allowing the UE to initiate the service, in this operation, the determination result is that both TAs are areas allowing the UE to initiate the service.
5. The AMF initiates an LCS process to obtain the accurate location information of the UE, and determines the area where the UE is currently located, such as TA2, according to the location of the UE.

6. The AMF transmits a configuration update instruction to the UE. The configuration update instruction includes an updated TAI list. The TAI list contains TA2 and contains an indication that the UE is in the TA2. For example, a dedicated field is provided in the configuration update instruction, and the value of the field is set to TA2, which indicates that the UE is currently in the TA2. Alternatively, if the TA2 corresponds to new slice information, the new slice information is contained in the configuration update instruction, and the configuration update instruction is transmitted to the UE.

7. After receiving the configuration update instruction, the UE needs to response and transmits a configuration update completion message to the AMF.

8. Since the new slice information provided by the AMF has no impact on an existing slice connection, the AMF does not need to release an NAS signaling connection after receiving the response, and the UE does not need to perform a registration process immediately.

The above third embodiment to sixth embodiment provide manners for processing a situation in which TAs corresponding to all TAIs in the broadcast message received by the UE are areas allowing the UE to initiate a service, and the UE may be in a connected state or an idle state. In this case, the AMF performs a configuration update for the UE, and the configuration update instruction may carry an indication that the UE is in the first TA. The following describes manners for processing a situation in which the TAs corresponding to some TAIs in the broadcast message received by the UE are areas allowing the UE to initiate a service.

Seventh Embodiment

In this embodiment, the UE in the connection state initiates an NAS request, such as a PDU session establishment request. The base station has no capability of determining an accurate location of the UE. Therefore, the base station transmits both two TAIs in ULI in an N2 message to the AMF. In this embodiment, it is assumed that the TA1 is an area allowing the UE to initiate a service, and the TA2 is a restricted area. For example, when the terminal device moves from the TA1 to the TA2, the first TA where the UE is currently located is the TA2.

Figure 12:
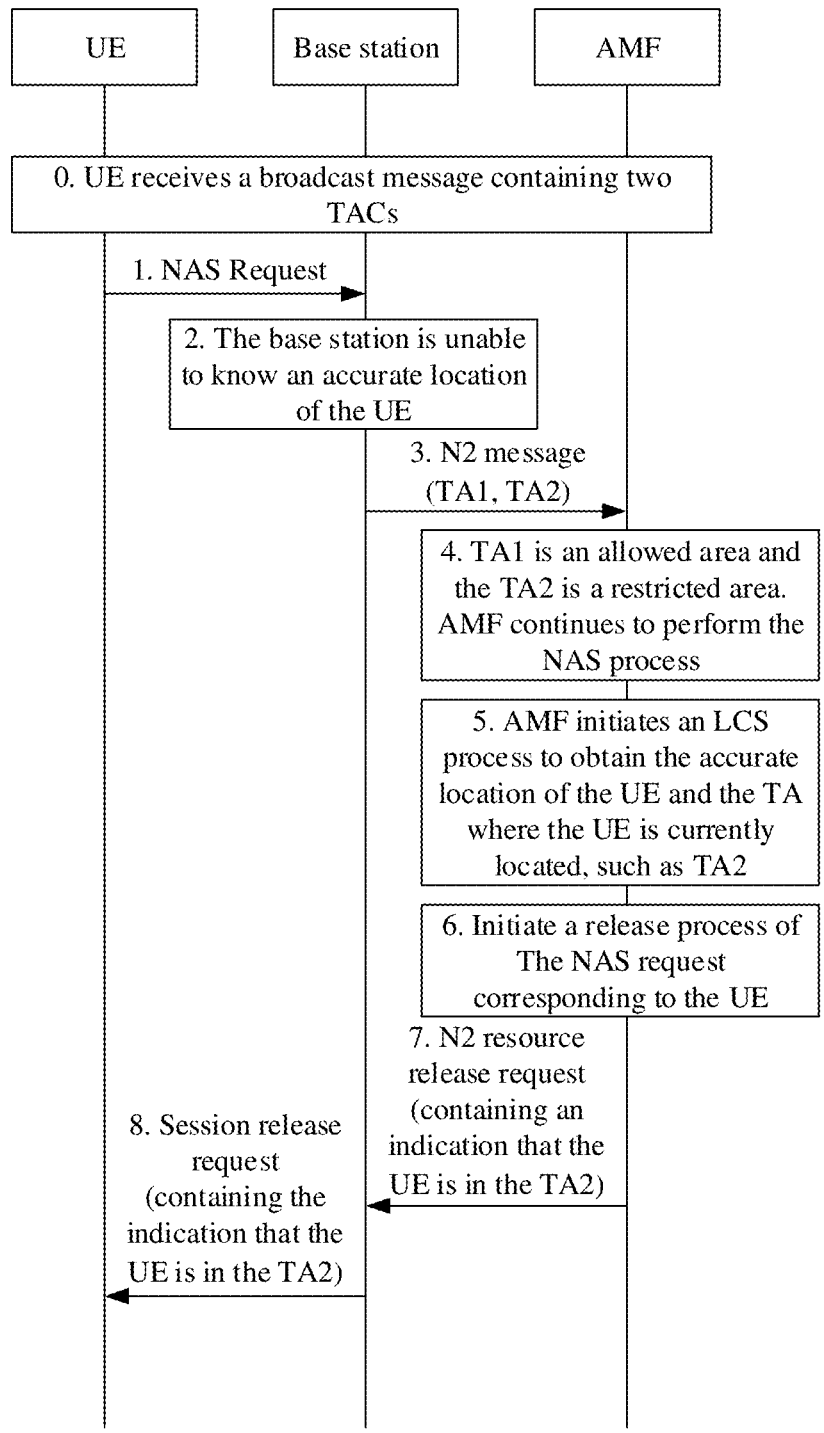
FIG. 12 is an implementation flowchart of a seventh embodiment of the present disclosure.

FIG. 12 is an implementation flowchart of the seventh embodiment of the present disclosure. The implementation includes the following operations.

1. The UE in a connected state initiates an NAS request message, such as a PDU session establishment request.

2-3. The base station has no capability of knowing the accurate location of the UE. The base station transmits an N2 message to the AMF. The N2 message carries the ULI, and the ULI carries the NAS request and two TAIs for the UE, i.e., TA1 and TA2.

4. The AMF receives the N2 message, accepts the NAS request, and continues to perform the NAS process. The AMF determines whether the two TAs are areas allowing the UE to initiate a service. Since it is considered in this embodiment that the TA2 is the restricted area, in this operation, the determination result is that the TA1 is the area allowing UE to initiate the service and the TA2 is the restricted area.

5. The AMF initiates an LCS process to obtain the accurate location information of the UE, and determines the area where the UE is currently located, such as TA2, according to the location of the UE.

6. Since the TA2 is the restricted area, a core network initiates a release process of the NAS request corresponding to the UE.

7. An indication that the UE is currently located in the TA2 is contained in an N2 resource release request message transmitted by the AMF to the base station. For example, a dedicated field is provided in the N2 resource release request message and the value of the field is set to TA2, which indicates that the UE is currently in the TA2.

8. The base station transmits a session release request to the UE, an indication that the UE is currently located in the TA2 is contained in the session release request.

Eighth Embodiment

In this embodiment, the UE in an idle state initiates an NAS request, such as a service request. The base station has no capability of determining an accurate location of the UE. Therefore, the base station transmits both TAIs (e.g. TA1, TA2) in ULI in an N2 message to the AMF. In this embodiment, it is considered that the TA1 is an area allowing the UE to initiate a service and the TA2 is a restricted area. For example, when the terminal device moves from TA1 to TA2, the first TA where the UE is currently located is the TA2.

Figure 13:
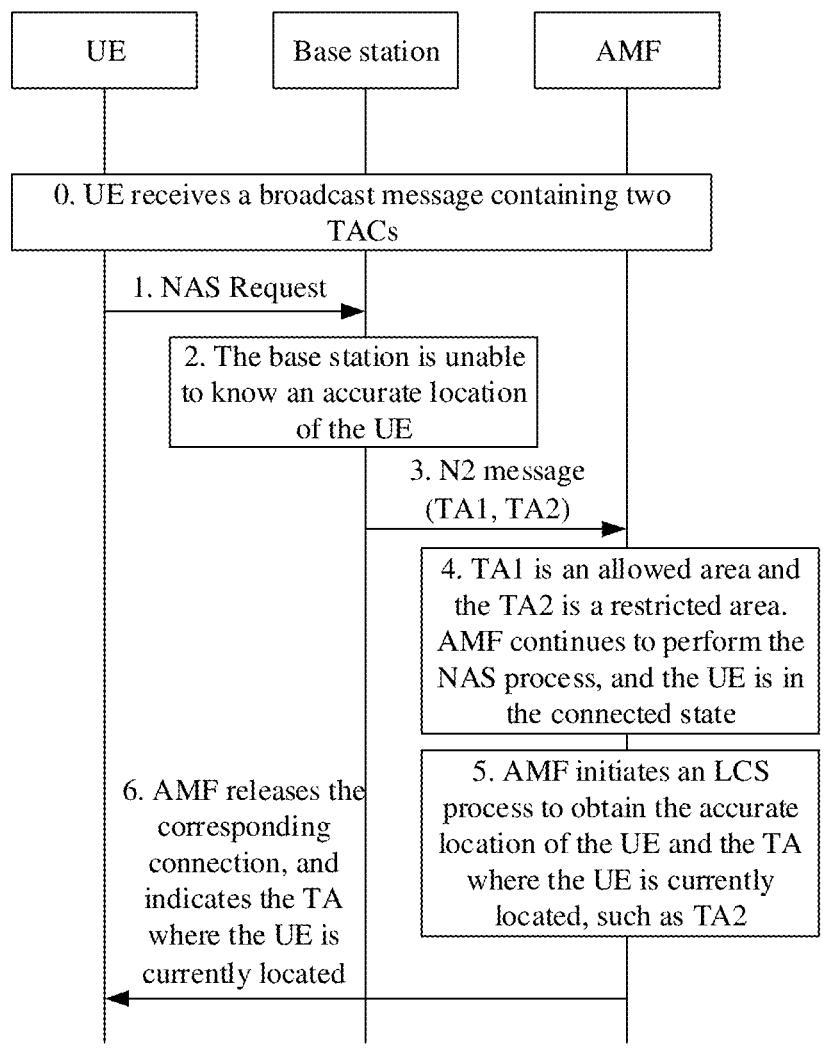
FIG. 13 is an implementation flowchart of an eighth embodiment of the present disclosure.

FIG. 13 is an implementation flowchart of the eighth embodiment of the present disclosure. The implementation includes the following operations.

1. The UE in the idle state initiates an NAS request message, such as a service request.

2-3. The base station has no capability of knowing the accurate location of the UE. The base station transmits an N2 message to the AMF. The N2 message carries ULI, and the ULI carries the NAS request and two TAIs for the UE, i.e., TA1 and TA2.

4. The AMF receives the N2 message, accepts the NAS request, continues to perform the NAS process, and enables the UE to be in a connected state. The AMF determines whether the two TAs are areas allowing the UE to initiate a service. Since it is considered in this embodiment that the TA2 is a restricted area, in this operation, the determination result is that the TA1 is the area allowing the UE to initiate the service and the TA2 is the restricted area.

5. The AMF initiates an LCS process to obtain the accurate location information of the UE, and determines the area where the UE is currently located, such as TA2, according to the location of the UE.

6. Since the TA2 is the restricted area, a core network releases a corresponding connection, and transmits a connection release request to the UE. The connection release request carries an indication that the terminal device is in the first TA. For example, a dedicated field is provided in the connection release request, and the value of the field is set to TA2, which indicates that the UE is currently in the TA2.

The above seventh embodiment and eighth embodiment provide manners for processing a situation in which TAs corresponding to a part of TAIs in the broadcast message received by the UE are areas allowing the UE to initiate a service, and the UE may be in a connected state or an idle state. In this case, when receiving the N2 message, the AMF first accepts the NAS request and enables the UE to be in the connected state. Then the AMF initiates the LCS process to determine the TA where the UE is located. If the TA where the UE is located is a restricted area, the AMF releases the corresponding connection, and the release request carries the indication that the UE is in the first TA.

It should be noted that the above embodiments only take the NAS request such as a service request and PDU session establishment request as example, but the method proposed in the present disclosure is not limited to these two processes. In addition, the present disclosure takes the broadcast message received by the UE containing TA1 and TA2 as an example, which indicates a case that the UE receives TAs. The present application does not limit the number of TAs received by the UE. That is, the number of TAs broadcast by the base station may not be limited to one or two.

Figure 14:
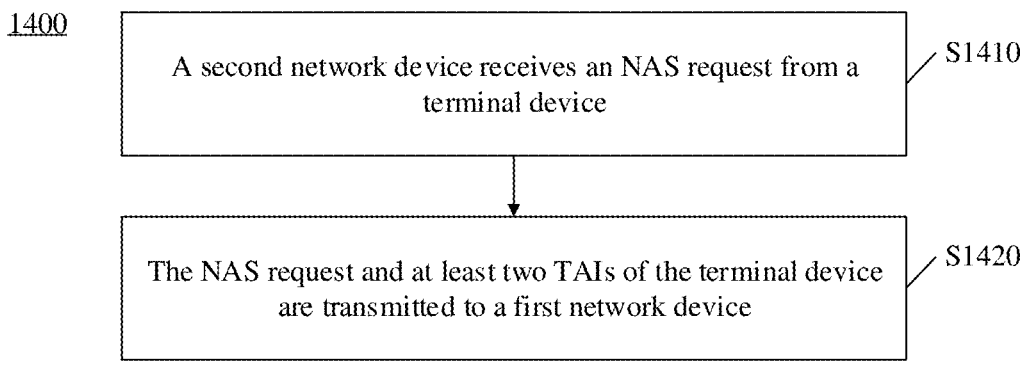
FIG. 14 is a schematic flowchart of a method 1400 for indicating a TA where a terminal device is located according to an embodiment of the present disclosure.

With reference to the above third embodiment to eighth embodiment, the present disclosure provides a method for determining a TA where the terminal is located. FIG. 14 is a schematic flowchart of a method 1400 for indicating a TA where a terminal device is located according to an embodiment of the present disclosure. Alternatively, the method may be applied to the system as illustrated in FIG. 1 or FIG. 2, but is not limited to thereto. The method may be applied to a second network device. The method includes at least part of the following contents.

In operation S1410, a second network device receives an NAS request from a terminal device.

In operation S1420, the second network transmits the NAS request and at least two TAIs for the terminal device to a first network device.

Alternatively, the second network device includes a base station and the first network device includes an AMF.

In some embodiments, the method further includes the following operations.

The second network device receives an N2 resource release request from the first network device. The N2 resource release request carries an indication that the terminal device is in the first TA. The first TA corresponds to a TAI in the at least two TAIs.

The second network device transmits a session release request to the terminal device. The session release request carries then indication that the terminal device is in the first TA.

Alternatively, the operation of transmitting the NAS request and the at least two TAIs for the terminal device to the first network device includes the following operation.

The second network device transmits an N2 message to the first network device. The N2 message carries the NAS request and ULI, and the ULI carries the at least two TAIs.

Alternatively, the NAS request includes a service request or a PDU session establishment request.

Figure 15:
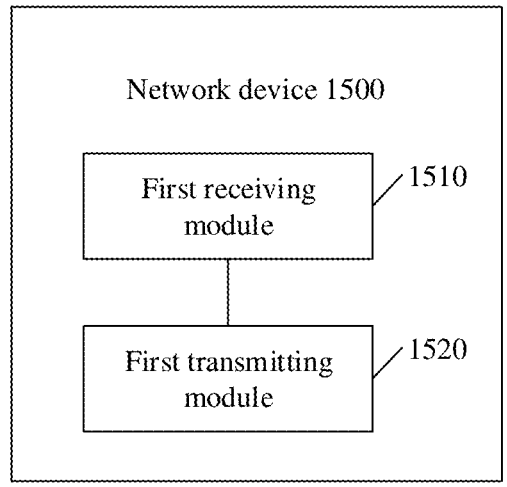
FIG. 15 is a schematic diagram of a structure of a network device 1500 according to an embodiment of the present disclosure.

The embodiment of the present disclosure provides a network device. FIG. 15 is a schematic diagram of a structure of a network device 1500 according to an embodiment of the present disclosure. The network device includes a first receiving module 1510 and a first transmitting module 1520.

The first receiving module is configured to receive a TAI of a first TA where a terminal device is located from a second network device.

The first transmitting module is configured to transmit an indication that the terminal device is in the first TA to the terminal device.

Alternatively, the first transmitting module 1520 is configured to transmit a configuration update instruction to the terminal device in response to determining that the first TA is an area allowing the terminal device to initiate a service and the first TA is not in an RA configured by a core network for the terminal device. The configuration update instruction carries the indication that the terminal device is in the first TA.

Alternatively, the first transmitting module 1520 is configured to transmit a rejection message to the terminal device in response to determining that the first TA is a restricted area. The rejection message carries the indication that the terminal device is in the first TA.

Alternatively, the restricted area includes a non-allowed area or a forbidden area.

Alternatively, the first receiving module 1510 is configured to receive an N2 message from the second network device. The N2 message carries ULI, and the ULI carries the TAI of the first TA.

Alternatively, the network device includes an AMF, and the second network device includes a base station.

It should be understood that the above and other operations and/or functions of the modules in the network device according to the embodiment of the present disclosure are used to respectively implement the corresponding processes performed by the first network device in the method 300 as illustrated in FIG. 3, which are not elaborated herein for the sake of brevity.

Figure 16:
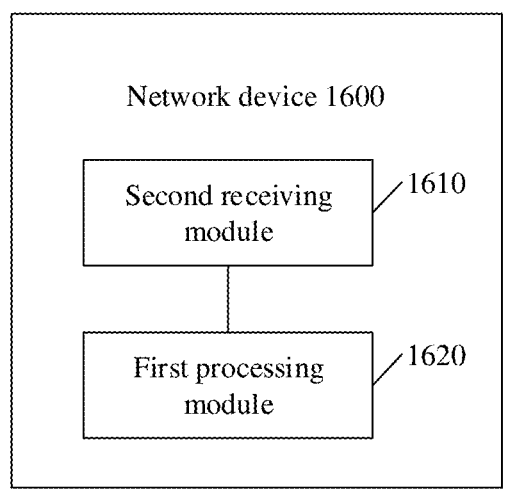
FIG. 16 is a schematic diagram of a structure of a network device 1600 according to an embodiment of the present disclosure.

The embodiment of the present disclosure provides a network device. FIG. 16 is a schematic diagram of a structure of a network device 1600 according to an embodiment of the present disclosure. The network device includes a second receiving module 1610 and a first processing module 1620.

The second receiving module is configured to receive an NAS request of a terminal device and at least two TAIs for the terminal device from a second network device.

The first processing module is configured to accept the NAS request.

Alternatively, the first processing module 1620 is further configured to transmit a configuration update instruction to the terminal device in response to at least two TAs corresponding to the at least two TAIs being areas allowing the terminal device to initiate a service.

Alternatively, the first processing module 1620 is further configured to determine a first TA where the terminal device is located from at least two TAs corresponding to the at least two TAIs, and transmit a configuration update instruction to the terminal device in response to the first TA being an area allowing the terminal device to initiate a service and the first TA being not in an RA configured by a core network for the terminal device. The configuration update instruction carries an indication that the terminal device is in the first TA.

Alternatively, the first processing module 1620 is further configured to determine a first TA where the terminal device is located from at least two TAs corresponding to the at least two TAIs, and transmit an N2 resource release request or a connection release request in response to the first TA being a restricted area. The N2 resource release request carries an indication that the terminal device is in the first TA, alternatively, the connection release request carries an indication that the terminal device is in the first TA.

Alternatively, the restricted area includes a non-allowed area or a forbidden area.

Alternatively, the first processing module 1620 is configured to perform an LCS process to determine a location of the terminal device, and determine the first TA where the terminal device is located according to the location.

Alternatively, the second receiving module 1610 is configured to receive an N2 message from the second network device. The N2 message carries the NAS request and ULI, and the ULI carries the at least two TAIs.

Alternatively, the network device includes an AMF and the second network device includes a base station.

The NAS request includes a service request or a PDU session establishment request.

It should be understood that the above and other operations and/or functions of the modules in the network device according to the embodiment of the present disclosure are used to respectively implement the corresponding processes performed by the first network device in the method 700 as illustrated in FIG. 7, which are not elaborated herein for the sake of brevity.

Figure 17:
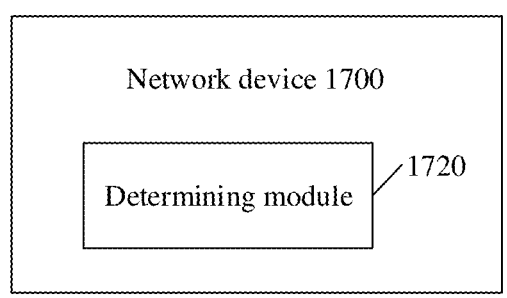
FIG. 17 is a schematic diagram of a structure of a network device 1700 according to an embodiment of the present disclosure.

An embodiment of the present disclosure provides a network device. FIG. 17 is a schematic diagram of a structure of a network device 1700 according to an embodiment of the present disclosure. The network device 1700 includes a determining module 1720.

The determining module is configured to determine a first TA where a terminal device is located from at least two TAs corresponding to at least two TAIs for the terminal device in response to receiving an NAS request from the terminal device.

Figure 18:
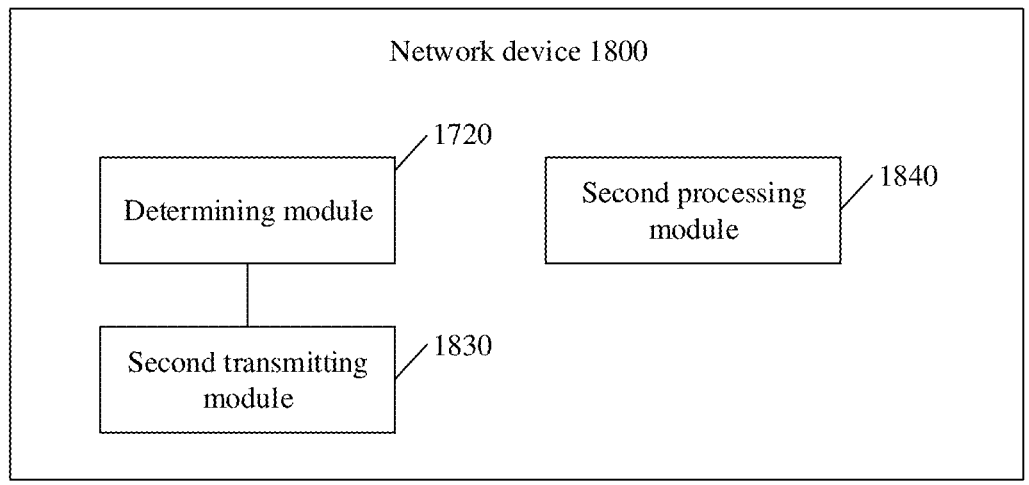
FIG. 18 is a schematic diagram of a structure of a network device 1800 according to an embodiment of the present disclosure.

An embodiment of the present disclosure provides a network device. FIG. 18 is a schematic diagram of a structure of a network device 1800 according to an embodiment of the present disclosure. The network device 1800 includes the determining module 1720 and a second transmitting module 1830.

The second transmitting module is configured to transmit a TAI of the first TA to a first network device.

Alternatively, the second transmitting module 1830 is configured to transmit an N2 message to the first network device. The N2 message carries ULI, and the ULI carries the TAI of the first TA.

The network device further includes a second processing module 1840 configured to transmit a rejection message to the terminal device in response to determining that the first TA is a restricted area. The rejection message carries an indication that the terminal device is in the first TA.

Alternatively, the restricted area includes a non-allowed area or a forbidden area.

Alternatively, the determining module 1720 is configured to determine a location of the terminal device, and determine the first TA where the terminal device is located according to the location.

Alternatively, the NAS request includes a service request or a PDU session establishment request.

Alternatively, the network device includes a base station.

Alternatively, the first network device includes an AMF.

It should be understood that the above and other operations and/or functions of the modules in the network device according to the embodiment of the present disclosure are used to respectively implement the corresponding processes performed by the second network device in the method 600 as illustrated in FIG. 6, which are not elaborated herein for the sake of brevity.

Figure 19:
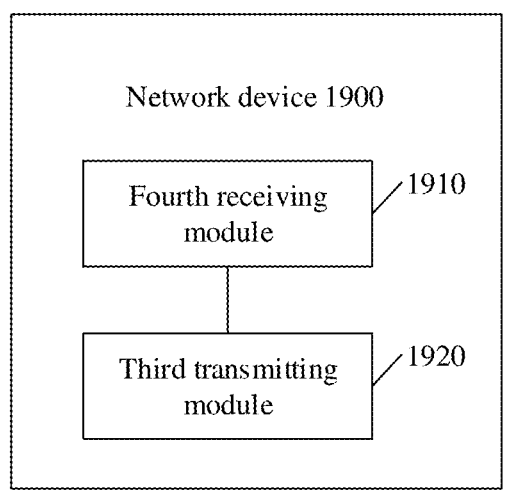
FIG. 19 is a schematic diagram of a structure of a network device 1900 according to an embodiment of the present disclosure.

An embodiment of the present disclosure provides a network device. FIG. 19 is a schematic diagram of a structure of a network device 1900 according to an embodiment of the present disclosure. The network device 1900 includes a fourth receiving module 1910 and a third transmitting module 1920.

The fourth receiving module is configured to receive an NAS request from a terminal device.

The third transmitting module is configured to transmit the NAS request and at least two TAIs for the terminal device to a first network device.

Figure 20:
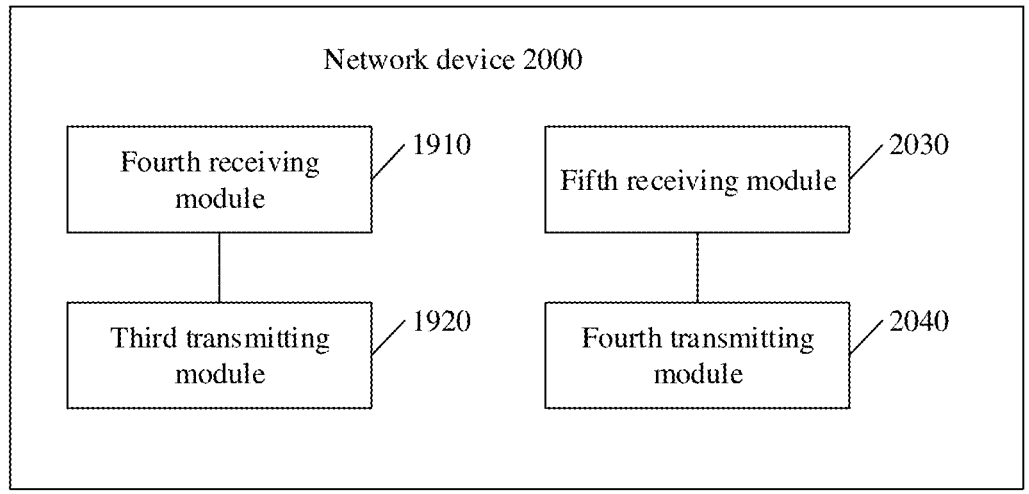
FIG. 20 is a schematic diagram of a structure of a network device 2000 according to an embodiment of the present disclosure.

An embodiment of the present disclosure provides a network device. FIG. 20 is a schematic diagram of a structure of a network device 2000 according to an embodiment of the present disclosure. The network device 2000 includes the fourth receiving module 1910, the third transmitting module 1920, a fifth receiving module 2030 and a fourth transmitting module 2040.

The fifth receiving module is configured to receive an N2 resource release request from the first network device. The N2 resource release request carries an indication that the terminal device is in a first TA, and the first TA corresponds to one TAI in the at least two TAIs.

The fourth transmitting module is configured to transmit a session release request to the terminal device. The session release request carries the indication that the terminal device is in the first TA.

Alternatively, the third transmitting module 1920 is configured to transmit an N2 message to the first network device. The N2 message carries the NAS request and ULI, and the ULI carries the at least two TAIs.

Alternatively, the NAS request includes a service request or a PDU session establishment request.

Alternatively, the network device includes a base station, and the first network device includes an AMF.

It should be understood that the above and other operations and/or functions of the modules in the network device according to the embodiment of the present disclosure are used to respectively implement the corresponding processes performed by the second network device in the method 1400 as illustrated in FIG. 14, which are not elaborated here for the sake of brevity.

It should be noted that the functions described by various modules (sub-modules, units or components, etc.) in the network device according to the embodiments of the present disclosure may be implemented by different modules (sub-modules, units or components, etc.) or by a same module (sub-module, unit or component, etc.). For example, the first receiving module and the second receiving module may be different modules or the same module, both cases can implement the corresponding functions in the embodiments of the present disclosure. In addition, the transmitting module and the receiving module in the embodiments of the present disclosure may be implemented by a transceiver of the device, and some or all of the remaining modules may be implemented by a processor of the device.

Figure 21:
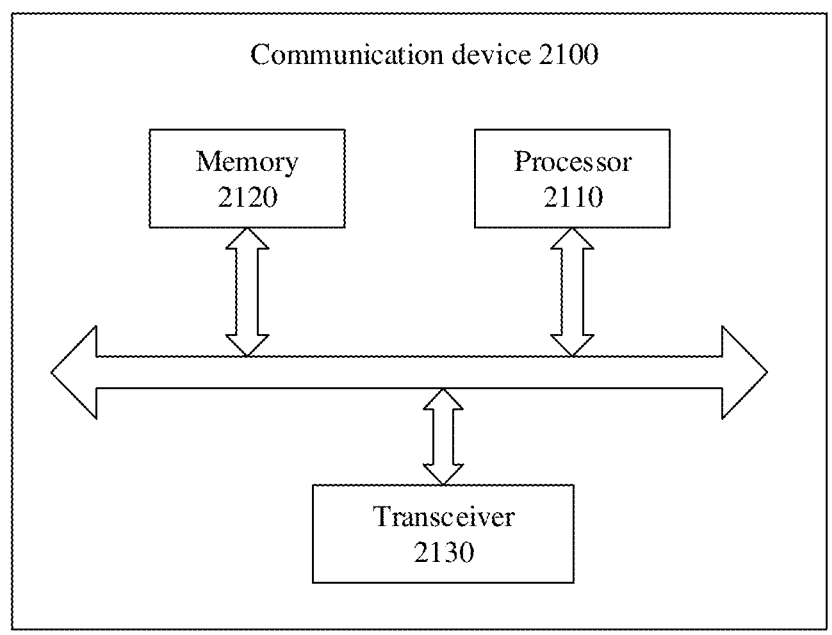
FIG. 21 is a schematic diagram of a structure of a communication device 2100 according to an embodiment of the present disclosure.

FIG. 21 is a schematic diagram of a structure of a communication device 2100 according to an embodiment of the present disclosure. The communication device 2100 illustrated in FIG. 21 includes a processor 2110 configured to invoke and run a computer program from a memory to implement the methods in the embodiments of the present disclosure.

Alternatively, as illustrated in FIG. 21, the communication device 2100 may also include a memory 2120. The processor 2110 may be configured to invoke and run a computer program from the memory 2120 to implement the methods in the embodiments of the present disclosure.

The memory 2120 may be a separate device independent of the processor 2110 or may be integrated in the processor 2110.

Alternatively, as illustrated in FIG. 21, the communication device 2100 may further include a transceiver 2130, and the processor 2110 may control the transceiver 2130 to communicate with other devices, and in particular to transmit information or data to other devices or to receive information or data transmitted by other devices.

The transceiver 2130 may include a transmitter and a receiver. The transceiver 2130 may further include an antenna, and the number of antennas may be one or more.

Alternatively, the communication device 2100 may be a terminal device of the embodiments of the present disclosure, and the communication device 2100 may implement corresponding processes implemented by the terminal device in the respective methods of the embodiments of the present disclosure, which will not be elaborated herein for the sake of brevity.

Alternatively, the communication device 2100 may be a network device of embodiments of the present disclosure, and the communication device 2100 may implement corresponding processes implemented by the network device in the respective methods of the embodiments of the present disclosure, which will not be elaborated herein for the sake of brevity.

Figure 22:
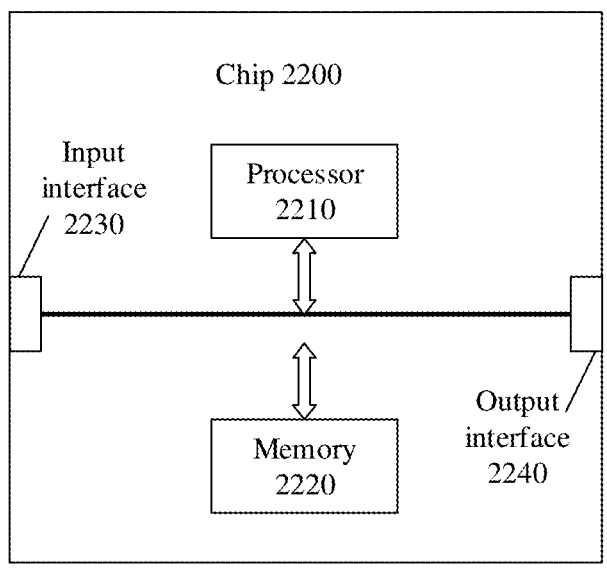
FIG. 22 is a schematic diagram of a structure of a chip 2200 according to an embodiment of the present disclosure.

FIG. 22 is a schematic diagram of a structure of a chip 2200 according to an embodiment of the present disclosure. The chip 2200 illustrated in FIG. 22 includes a processor 2210 configured to invoke and run a computer program from a memory to implement the methods in embodiments of the present disclosure.

Alternatively, as illustrated in FIG. 22, the chip 2200 may further include a memory 2220. The processor 2210 may invoke and run a computer program from the memory 2220 to implement the methods in embodiments of the present disclosure.

The memory 2220 may be a separate device independent of the processor 2210 or may be integrated in the processor 2210.

Alternatively, the chip 2200 may further include an input interface 2230. The processor 2210 may control the input interface 2230 to communicate with other devices or chips, in particular, to obtain information or data transmitted by other devices or chips.

Alternatively, the chip 2200 may further include an output interface 2240. The processor 2210 may control the output interface 2240 to communicate with other devices or chips, in particular, to output information or data to other devices or chips.

Alternatively, the chip may be applied to the terminal device in the embodiments of the present disclosure, and the chip may implement corresponding processes implemented by the terminal device in the respective methods of the embodiments of the present disclosure, which will not be elaborated herein for the sake of brevity.

Alternatively, the chip may be applied to the network device in the embodiments of the present disclosure, and the chip may implement the corresponding processes implemented by the network device in the respective methods of the embodiments of the present disclosure, which will not be elaborated here for the sake of brevity.

It should be understood that the chip in embodiments of the present disclosure may also be referred to as a system level chip, a system chip, a chip system or a system-on-chip or the like.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the memory described above is for exemplary but not limited description, and, for example, the memory in embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a Direct Rambus RAM (DR RAM), etc. That is, the memory in embodiments of the present disclosure is intended to include but not limited to these and any other suitable types of memory.

The above-described embodiments may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, the flows or functions described in accordance with embodiments of the present disclosure is generated in whole or in part. The computer may be a general purpose computer, a special purpose computer, a computer network, or other programmable device. The computer instructions may be stored in a computer-readable storage medium, or be transmitted from a computer-readable storage medium to another computer-readable storage medium. For example, the computer instructions may be transmitted from a Web site, computer, server, or data center to another Web site, computer, server, or data center via wired (e.g. a Coaxial cable, optical fiber, Digital Subscriber Line (DSL)) or wireless (e.g. Infrared, wireless, microwave, etc.). The computer-readable storage medium may be any usable medium accessible to and stored by a computer or a data storage device such as a server, data center, etc. integrate with one or more usable media. The usable media may be a magnetic media (e.g.

Floppy disk, hard disk, magnetic tape), optical media (e.g. DVD), or semiconductor media (e.g. Solid State Disk (SSD)), etc.

It should be understood that in various embodiments of the present disclosure, sizes of the sequence numbers of the above-mentioned processes do not mean the order of execution, and the execution order of various process should be determined by its function and inherent logic, and should not considered as limitation to the implementation of the embodiments of the present disclosure.

Those skilled in the art will clearly appreciate that, for convenience and conciseness of description, the specific operating processes of the above-described systems, devices and units may refer to the corresponding processes in the aforementioned method embodiments, and will not be elaborated herein again.

The above description is only the specific embodiments of the present disclosure, but the scope of protection of the present disclosure is not limited thereto. Changes or substitutions easy to any person skilled in the art should fall within the scope of protection of the present disclosure. Therefore, the protection scope of the present disclosure should be subject to the protection scope of the claims.

The invention claimed is:

1. A method of wireless communication of a first network device, comprising:
receiving, by the first network device, a Non-access stratum (NAS) request of a terminal device and at least two tracking area identities (TAIs) for the terminal device from a second network device, each of the at least two TAIs corresponding to a tracking area code (TAC) associated with a satellite; and
accepting, by the first network device, the NAS request,
wherein the receiving, by the first network device, the NAS request of the terminal device and the at least two TAIs for the terminal device from the second network device comprises:
receiving, by the first network device, an N2 message from the second network device, the N2 message carrying the NAS request and user location information (ULI), and the ULI carrying the at least two TAIs for the terminal device, and wherein
the first network device is an Access and Mobility Management Function (AMF), and the second network device is a base station.

2. The method of claim 1, wherein:
one of the at least two TAIs is a TAI corresponding to a tracking area (TA) where the terminal device is located, and
the TA is determined by the second network device.

3. The method of claim 1, wherein:
a tracking area (TA) corresponding to any of the at least two TAIs is an area allowing the terminal device to initiate a service, or
a TA corresponding to at least one of the at least two TAIs is an area allowing the terminal device to initiate a service.

4. The method of claim 3, wherein the TA in which the terminal device is located is the area allowing the terminal device to initiate the service.

5. The method of claim 1, further comprising:
receiving, by the first network device, a tracking area identity (TAI) of a tracking area (TA), in the (TAIs), where the terminal device is located from the second network device,
wherein the TA where the terminal device is located is determined by the second network device.

6. A first network device, comprising:
a processor; and
memory storing instructions, which when executed by the processor, cause the processor to:
receive a Non-access stratum (NAS) request of a terminal device and at least two tracking area identities (TAIs) for the terminal device from a second network device, each of the at least two TAIs corresponding to a tracking area code (TAC) associated with a satellite; and
accept the NAS request,
wherein the memory storing instructions, which when executed by the processor, further cause the processor to:
receive an N2 message from the second network device, the N2 message carrying the NAS request and user location information (ULI), and the ULI carrying the at least two TAIs, and wherein
the first network device is an Access and Mobility Management Function (AMF), and the second network device is a base station.

7. The first network device of claim 6, wherein:
one of the at least two TAIs is a TAI corresponding to a tracking area (TA) where the terminal device is located, and
the TA is determined by the second network device.

8. The first network device of claim 6, wherein:
a TA corresponding to any of the at least two TAIs is an area allowing the terminal device to initiate a service, or
a TA corresponding to at least one of the at least two TAIs is an area allowing the terminal device to initiate a service.

9. The first network device of claim 8, wherein the TA where the terminal device is located is the area allowing the terminal device to initiate the service.

10. The first network device of claim 6, wherein the memory storing instructions, which when executed by the processor, further cause the processor to:
receive a TAI of a TA, in the TAIs, where the terminal device is located from the second network device, the TA where the terminal device is located being determined by the second network device.

11. A second network device, comprising:
a processor; and
memory storing instructions, which when executed by the processor, cause the processor to:
receive a Non-access stratum (NAS) request from a terminal device; and
transmit the NAS request and at least two tracking area identities (TAIs) for the terminal device to a first network device, each of the at least two TAIs corresponding to a tracking area code (TAC) associated with a satellite,
wherein the memory storing instructions, which when executed by the processor, further cause the processor to:
transmit an N2 message to the first network device, the N2 message carrying the NAS request and user location information (ULI), and the ULI carrying the at least two TAIs, and wherein
the first network device is an Access and Mobility Management Function (AMF), and the second network device is a base station.

12. The second network device of claim 11, wherein:
one of the at least two TAIs is a TAI corresponding to a tracking area (TA) where the terminal device is located, and
the TA is determined by the second network device.

13. The second network device of claim 11, wherein:
a TA corresponding to any of the at least two TAIs is an area allowing the terminal device to initiate a service, or
a TA corresponding to at least one of the at least two TAIs is an area allowing the terminal device to initiate a service.

14. The second network device of claim 13, wherein the TA where the terminal device is located is the area allowing the terminal device to initiate the service.

15. The second network device of claim 11, wherein the memory storing instructions, which when executed by the processor, further cause the processor to:
transmit a TAI of a TA, in the TAIs, where the terminal device is located to the first network device, the TA where the terminal device is located being determined by the second network device.

* * * * *